United States Patent
Huang et al.

(10) Patent No.: US 11,159,342 B2
(45) Date of Patent: Oct. 26, 2021

(54) MAC ADDRESS SYNCHRONIZATION (71) Applicant: NEW H3C TECHNOLOGIES CO., LTD., Hangzhou (CN)

(72) Inventors: Liwei Huang, Beijing (CN); Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 245 days.

(21) Appl. No.: 16/496,147

(22) PCT Filed: Mar. 23, 2018

(86) PCT No.: PCT/CN2018/080222
§ 371 (c)(1),
(2) Date: Sep. 20, 2019

(87) PCT Pub. No.: WO2018/171722
PCT Pub. Date: Sep. 27, 2018

(65) Prior Publication Data
US 2020/0044894 A1 Feb. 6, 2020

(30) Foreign Application Priority Data
Mar. 24, 2017 (CN) .......................... 201710184745.1

(51) Int. Cl.
*H04J 3/24* (2006.01)
*H04L 12/46* (2006.01)
(Continued)

(52) U.S. Cl.
CPC ...... *H04L 12/4675* (2013.01); *H04L 12/4645* (2013.01); *H04L 45/245* (2013.01); *H04L 61/6022* (2013.01)

(58) Field of Classification Search
USPC ....... 370/236, 252, 254, 255, 350, 351, 359, 370/386, 389, 392, 393, 395.2, 395.3,
(Continued)

(56) References Cited

U.S. PATENT DOCUMENTS

2011/0116509 A1* 5/2011 Moreno .................. H04L 45/28
370/401
2011/0292947 A1* 12/2011 Vobbilisetty .......... H04L 49/252
370/397
(Continued)

FOREIGN PATENT DOCUMENTS

CN 104243318 12/2014
CN 104954218 9/2015
(Continued)

OTHER PUBLICATIONS

Office Action issued in Corresponding Japanese Application No. 2019-552071, dated Sep. 1, 2020 (English Translation provided).
(Continued)

*Primary Examiner* — Nguyen H Ngo
(74) *Attorney, Agent, or Firm* — Norton Rose Fulbright US LLP (57) ABSTRACT

A method, an apparatus and a VTEP for synchronizing MAC address are provided. According to the method, first mapping relationship configured on first aggregation/IPP port of first VTEP is notified to second VTEP in a same MLAG system. The second VTEP configures the relationship on second aggregation/IPP port of the second VETP. The relationship represents a mapping relationship of first tag ID of first port of the first VTEP to first VXLAN ID. Second tag ID of second port of the second VTEP differs from the first tag ID. The first VTEP receives a successful configuration message returned by the second VTEP after successfully configuring the relationship on the second IPP port. The first VTEP then sends first MAC address to the second IPP port via the first IPP port, wherein the first MAC address is the MAC address of a device accessing the first VTEP via the first port.

15 Claims, 4 Drawing Sheets

```
The first mapping relationship configured on the first aggregation port   S201
and the first IPP port of the first VTEP is notified to the second VTEP
in the same MLAG system, so that the second VTEP can configure the
  first mapping relationship on the second aggregation port and the
         second IPP port of the second VTEP
                         ↓
   A successful configuration message that is returned by the second    S202
VTEP after successfully configuring the first mapping relationship on
         the second IPP port is received
                         ↓
   A first MAC address of a device which accesses the first VTEP        S203
through the first port is sent to the second IPP port via the first IPP
                             port
```

(51) Int. Cl.
*H04L 12/709* (2013.01)
*H04L 29/12* (2006.01)

(58) Field of Classification Search
USPC ..... 370/395.53, 395.54, 419, 463, 475, 496, 370/503
See application file for complete search history.

(56) References Cited

U.S. PATENT DOCUMENTS

| | | |
|---|---|---|
| 2012/0072567 A1* | 3/2012 | Yin ....................... G06F 13/102 709/223 |
| 2015/0381495 A1 | 12/2015 | Cherian et al. |
| 2016/0036728 A1 | 2/2016 | Duda |
| 2017/0048084 A1 | 2/2017 | Sigoure et al. |
| 2017/0228251 A1* | 8/2017 | Yang ................... H04L 12/4675 |
| 2018/0219773 A1* | 8/2018 | Li ....................... G06F 9/45558 |

FOREIGN PATENT DOCUMENTS

| | | |
|---|---|---|
| CN | 105634901 | 6/2016 |
| JP | 2013535922 | 9/2013 |

OTHER PUBLICATIONS

Extended European Search Report issued in Counterpart European Patent Application No. 18771473.8, dated Dec. 6, 2019.
International Search Report and Written Opinion issued in Corresponding International Patent Application No. PCT/CN2018/080222, dated May 7, 2018.

* cited by examiner

FIG. 1

| |
|---|
| The first mapping relationship configured on the first aggregation port and the first IPP port of the first VTEP is notified to the second VTEP in the same MLAG system, so that the second VTEP can configure the first mapping relationship on the second aggregation port and the second IPP port of the second VTEP | S201 |
| A successful configuration message that is returned by the second VTEP after successfully configuring the first mapping relationship on the second IPP port is received | S202 |
| A first MAC address of a device which accesses the first VTEP through the first port is sent to the second IPP port via the first IPP port | S203 |

FIG. 8

US 11,159,342 B2

MAC ADDRESS SYNCHRONIZATION

CROSS REFERENCE TO RELATED APPLICATION

This application is a national phase under 35 U.S.C. § 371 of International Application No. PCT/CN2018/080222, filed Mar. 23, 2018, which claims priority to Chinese Patent Application No. 201710184745.1 entitled "METHOD AND APPARATUS FOR SYNCHRONIZING MAC ADDRESS" filed on Mar. 24, 2017, the entire contents of each of which are incorporated herein by reference.

BACKGROUND

An Ethernet Virtual Private Network (EVPN) relates to a layer-2 Virtual Private Network (VPN) technique, where EVPN routing information is notified by using a Multi-Protocol Border Gateway Protocol (MP-BGP) on a control plane and a packet is forwarded by means of Virtual Extensible Local Area Network (VXLAN) encapsulation on a data plane.

DETAILED DESCRIPTION OF THE EMBODIMENTS

Example embodiments will be described in detail herein with the examples thereof expressed in the drawings. When the following descriptions involve the drawings, like numerals in different drawings represent like or similar elements unless stated otherwise. The implementations described in the following example embodiments do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

Figure 1:
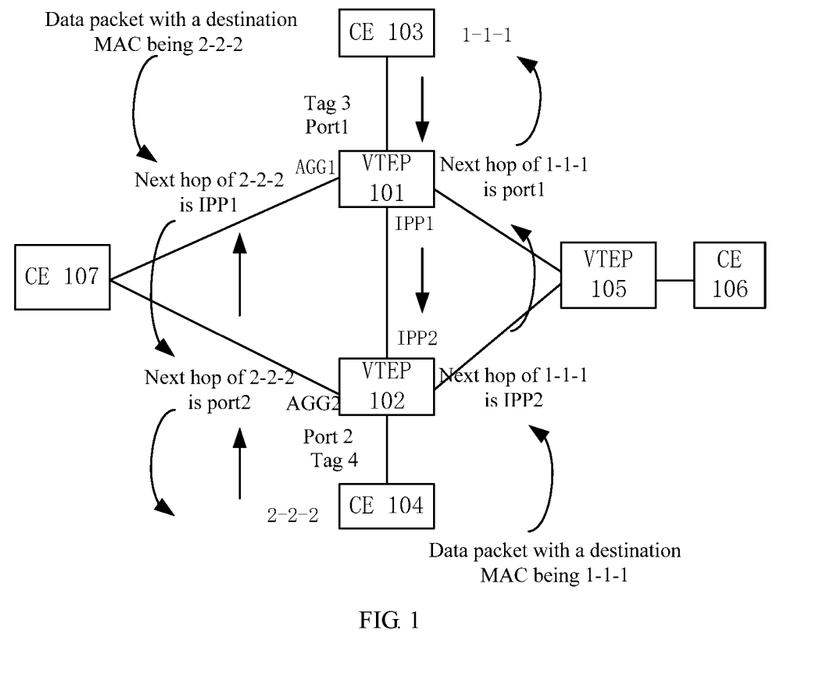
FIG. 1 is a schematic diagram illustrating a process of synchronizing a Media Access Control (MAC) address between two VXLAN Tunnel End Points (VTEPs) in a distributed aggregation system according to an example of the present disclosure.

FIG. 1 illustrates a schematic diagram of a network of a Multi-Chassis Link Aggregation (MLAG) system according to an example of the present disclosure. In the MLAG system as shown in FIG. 1, when a Customer Edge device (hereinafter, referred to as CE) 107 forwards a data flow to a CE 106, the flow from the CE 107 may reach a VXLAN Tunnel End Point (VTEP) 105 via any one of a VTEP 101 and a VTEP 102 and can be then forwarded to the CE 106. A CE 103 is mounted to a physical port 1 of the VTEP 101 and a CE 104 is mounted to a physical port 2 of the VTEP 102. The CE 103, CE 104, CE 106 and CE 107 illustrated in FIG. 1 may be virtual machines (VMs). In the MLAG system, when the CE 103 and the CE 104 are to communicate with each other, the two VMs need to synchronize a Media Access Control (MAC) address between the VTEP 101 and the VTEP 102 before achieving service communication.

Assuming that the MAC address of the CE 103 is A-A-A, the process of synchronizing the MAC address between the VTEP 101 and the VTEP 102 may include that: when a link connected between the CE 103 and the VTEP 101 is UP, the CE 103 may send a free Address Resolution Protocol (ARP) packet and the VTEP 101 may learn a VXLAN MAC address of the CE 103 and a forwarding entry of the MAC address, where an egress port in the forwarding entry is port 1. After learning the VXLAN MAC address, the VTEP 101 may synchronize the forwarding entry to the VTEP 102 based on a Multi-Chassis Link Aggregation (MLAG) protocol so as to form a forwarding entry of the MAC address A-A-A on the VTEP 102, where an egress port in the forwarding entry is an Internet Printing Protocol (IPP) port IPP2 on the VTEP 102. When the CE 104 is to forward a data flow with a destination MAC address being A-A-A, the flow may be first forwarded to an IPP port IPP1 of the VTEP 101 via the IPP port IPP2 of the VTEP 102 after the VXLAN MAC forwarding entry is queried from the VTEP 102, and then the flow may be forwarded to the CE 103 via the port 1.

The synchronization of the MAC address between the two VTEPs as shown in FIG. 1 can be achieved because the port 1 and the port 2 have the same tag identifier (ID), i.e., a device (e.g., the CE 103) connected to the port 1 and a device (e.g., the CE 104) connected to the port 2 belong to the same Virtual Local Area Network (VLAN). Thus, the two VTEPs can synchronize a forwarding entry via their respective IPP ports. If their tag IDs are different, for example, the tag ID of the port 1 is 3 and the tag ID of the port 2 is 4, the device (e.g., the CE 103) connected to the port 1 and the device (e.g., the CE 104) connected to the port 2 belong to different VLANs. Thus, the two VTEPs cannot achieve MAC address synchronization therebetween via their respective IPP ports.

In a MLAG system provided by an example of the present disclosure, to allow synchronization of a MAC address between two VTEPs having different port tag IDs, a first VTEP may notify a first mapping relationship configured on its first aggregation port and first IPP port to a second VTEP in the same MLAG system. The first mapping relationship represents a mapping relationship of a first tag ID of the first port to a first VXLAN ID, where the first port is on the first VTEP and used to access a device. Thus, the second VTEP can configure the first mapping relationship on a second aggregation port and a second IPP port thereof. Hence, after receiving a successful configuration message returned by the second VTEP, the first VTEP may send a first MAC address of a device that accesses the first VTEP via the first port to the second IPP port via the first IPP port, thereby achieving the synchronization of the MAC address from the first VTEP to the second VTEP. Similar to the above process, the first VTEP may receive a second mapping relationship from the second VTEP. The second mapping relationship represents a mapping relationship of a second tag ID of the second port to a second VXLAN ID, where the second port is on the second VTEP and used to access a device. Then, the first VTEP may configure the second mapping relationship on the first aggregation port and the first IPP port, and thus can receive, via the first IPP port, a second MAC address of a device that accesses the second VTEP via the second port, thereby achieving the synchronization of the MAC address from the second VTEP to the first VTEP. In an example of the present disclosure, different tags can be mapped to the same VXLAN by configuring the same mapping relationship on the first IPP port and the second IPP port (e.g., configuring the first or second mapping relationship on both of the first IPP port and the second IPP port), thus allowing bidirectional MAC address synchronization between different VTEPs via the first IPP port and the second IPP port. The process of implementing the above method will be described in detail below in conjunction with a specific example.

Figure 2:
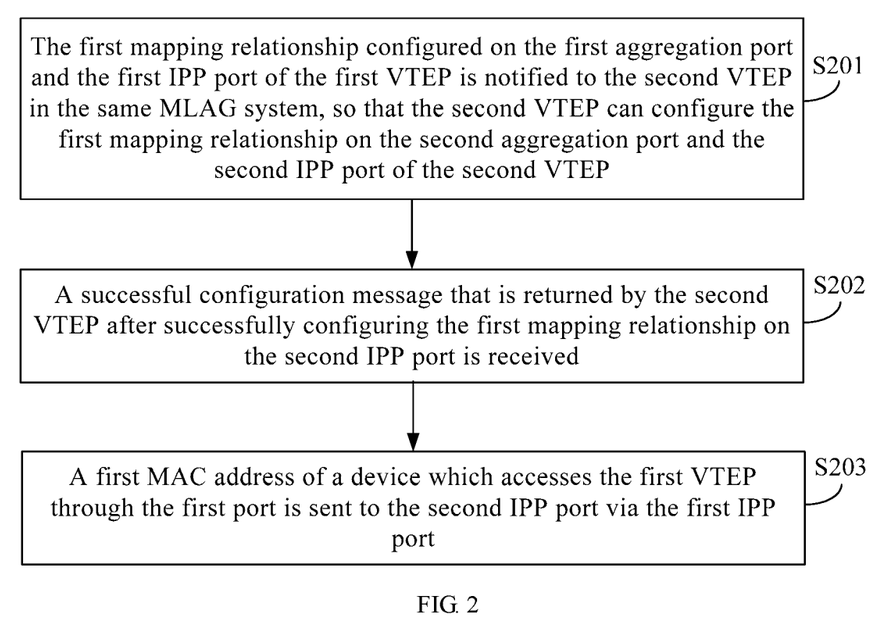
FIG. 2 is a flowchart illustrating a method of synchronizing a MAC address according to an example of the present disclosure.

FIG. 2 is a flowchart illustrating a method of synchronizing a MAC address according to an example of the present disclosure. This example can be applied to the first VTEP, and as shown in FIG. 2, the method of synchronizing a MAC address may include the following blocks.

At block S201, the first mapping relationship configured on the first aggregation port and the first IPP port of the first VTEP may be notified to the second VTEP in the same MLAG system, so that the second VTEP can configure the first mapping relationship on the second aggregation port and the second IPP port of the second VTEP.

The first mapping relationship as mentioned above represents a mapping relationship of the first tag ID of the first port to the first VXLAN ID. The first port is a port that is on the first VTEP and used to access a device, and the second tag ID of the second port that is on the second VTEP and used to access a device is different from the first tag ID of the first port.

The following description is further made by referring to the network shown in FIG. 1. It needs to be noted that the network shown in FIG. 1 is just an example and the synchronization method may also be applied to a MLAG system with another network structure.

As shown in FIG. 1, the VTEP 101 has a port to which a device is accessed, i.e., port 1, and an aggregation port AGG1. The VTEP 102 has a port to which a device is accessed, i.e., port 2, and an aggregation port AGG2. The tag ID of the port 1 is 3 and the tag ID of the port 2 is 4. Taking the first VTEP as the VTEP 101 and the second VTEP as the VTEP 102 for an example, the port 1 serves as the first port with the first tag ID being 3 and the port 2 serves as the second port with the second tag ID being 4. The AGG1 serves as the first aggregation port and the AGG2 serves as the second aggregation port. The IPP port, i.e., IPP1, via which the VTEP 101 is connected with the VTEP 102 serves as the first IPP port, and the IPP port, i.e., IPP2, via which the VTEP 102 is connected with the VTEP 101 serves as the second IPP port. Assuming that the first preset VXLAN ID is 10, the VTEP 101 may notify a mapping relationship of the first tag ID 3 configured on the AGG1 and the IPP1 to the first preset VXLAN ID 10, to the VTEP 102, based on the MLAG protocol. After receiving the mapping relationship of the first tag ID 3 to the first preset VXLAN ID 10, the VTEP 102 may configure the mapping relationship on the AGG2 and the IPP2. It may be possible that there are a plurality of VTEPs each of which is used as the second VTEP, and the description is made by only taking the VTEP 102 as example in this example.

Moreover, before notifying the first mapping relationship of the first tag ID of the first port to the first preset VXLAN ID, to the second VTEP in the same MLAG system, the first VTEP may configure the first mapping relationship on the first aggregation port and the first IPP port if it is detected that the first aggregation port and the first IPP port are not configured with the first mapping relationship.

For example, configuring the first mapping relationship on the first aggregation port and the first IPP port may include the following cases:

(1) When the first aggregation port is not associated with the first tag ID, the first mapping relationship of the first tag ID to the first VXLAN ID may be configured on the first aggregation port as well as on the first IPP port.

(2) When the first aggregation port is not associated with the first preset VXLAN ID, the first mapping relationship of the first tag ID to the first VXLAN ID may be configured on the first aggregation port as well as on the first IPP port.

(3) When the first aggregation port is not associated with the first tag ID and the first preset VXLAN ID, the first mapping relationship of the first tag ID to the first VXLAN ID may be configured on the first aggregation port as well as on the first IPP port.

At block S202, a successful configuration message that is returned by the second VTEP after successfully configuring the first mapping relationship on the second IPP port may be received.

In the example, the second VTEP may return a successful configuration message to the first VTEP after successfully configuring the first mapping relationship on the second IPP port.

At block S203, a first MAC address of a device that accesses the first VTEP via the first port may be sent to the second IPP port via the first IPP port.

In the example, since the first IPP port and the second IPP port are both configured with the first mapping relationship, the first VTEP may send the first MAC address of the device that accesses the first VTEP via the first port, to the second IPP port via the first IPP port.

For example, as the IPP1 of the VTEP 101 and the IPP2 of the VTEP 102 are both configured with the mapping relationship of the first tag ID 3 to the first VXLAN ID 10, the VTEP 101 may send a MAC address of a device which accesses the VTEP 101 through the port 1, i.e., the CE 103 in FIG. 1, to the VTEP 102 via the IPP1, and the VTEP 102 may receive the MAC address of the CE 103 via the IPP2.

According to the above example, the first mapping relationship of the first tag ID of the first port to the first VXLAN ID that is configured on the first aggregation port and the first IPP port of the first VTEP may be notified to the second VTEP in the same MLAG system. Then, the second VTEP successfully configures the first mapping relationship on the second aggregation port and the second IPP port of the second VTEP, that is, the first IPP port and the second IPP port may be configured with the same mapping relationship. Then, the first VTEP may send a first MAC address of a device which accesses the first VTEP through the first port to the second IPP port via the first IPP port, thereby realizing the synchronization of the MAC address from the first VTEP to the second VTEP.

Figure 3:
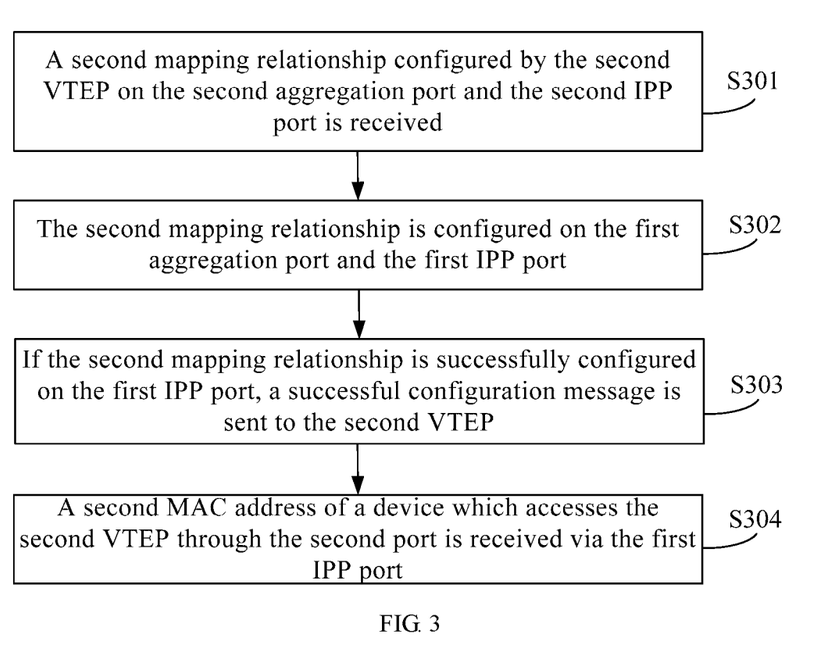
FIG. 3 is a flowchart illustrating a method of synchronizing a MAC address according to another example of the present disclosure.

FIG. 3 is a flowchart illustrating a method of synchronizing a MAC address according to another example of the present disclosure. As shown in FIG. 3, the method of synchronizing a MAC address may further include the following blocks on the basis of the method example illustrated in FIG. 2.

At block S301, a second mapping relationship configured on the second aggregation port and the second IPP port may be received from the second VTEP, where the second mapping relationship represents a mapping relationship of the second tag ID of the second port of the second VTEP to the second VXLAN ID.

In addition to notifying the first mapping relationship configured on the first aggregation port and the first IPP port to the second VTEP in the same MLAG system, the first VTEP may also receive the second mapping relationship of the second tag ID to the second VXLAN ID from the second VTEP. The second mapping relationship may be sent to the first VTEP by the second VTEP after the second VTEP configures the second mapping relationship on the second aggregation port and the second IPP port.

FIG. 1 is continued as an example. Assuming that the second VXLAN ID is 20, the VTEP 102 may send a mapping relationship of the second tag ID 4 to the second VXLAN ID 20 to the VTEP 101 based on the MLAG protocol after configuring the mapping relationship on the AGG2 and the IPP2.

At block S302, the second mapping relationship may be configured on the first aggregation port and the first IPP port.

After receiving the mapping relationship of the second tag ID 4 to the second VXLAN ID 20 from the VTEP 102, the VTEP 101 may configure the mapping relationship on the AGG1 and the IPP1.

At block S303, if the second mapping relationship is successfully configured on the first IPP port, a successful configuration message may be sent to the second VTEP.

The VTEP 101 may send a successful configuration message to the VTEP 102 after successfully configuring the mapping relationship of the second tag ID 4 to the second VXLAN ID 20 on the IPP1. Thus, the VTEP 102 may send the MAC address of a device which accesses the VTEP 102 through the port 2, i.e., the CE 104 in FIG. 1, to the VTEP 101 via the IPP2.

At block S304, a second MAC address of a device which accesses the second VTEP through the second port may be received via the first IPP port.

After the VTEP 102 sends the MAC address of the CE 104 to the VTEP 101 via the IPP2, the VTEP 101 may receive the MAC address of the CE 104 via the IPP1.

According to the above example, the first VTEP may receive the second mapping relationship of the second tag ID to the second VXLAN ID, which is sent by the second VTEP after configuring the second mapping relationship on the second aggregation port and the second IPP port. The first VTEP may configure the second mapping relationship on the first aggregation port and the first IPP port. Then, the first VTEP may receive the second MAC address of the device which accesses the second VTEP through the second port, via the first IPP port that is successfully configured with the second mapping relationship. Thus, the synchronization of the MAC address of the second VTEP to the first VTEP can be achieved.

Figure 4:
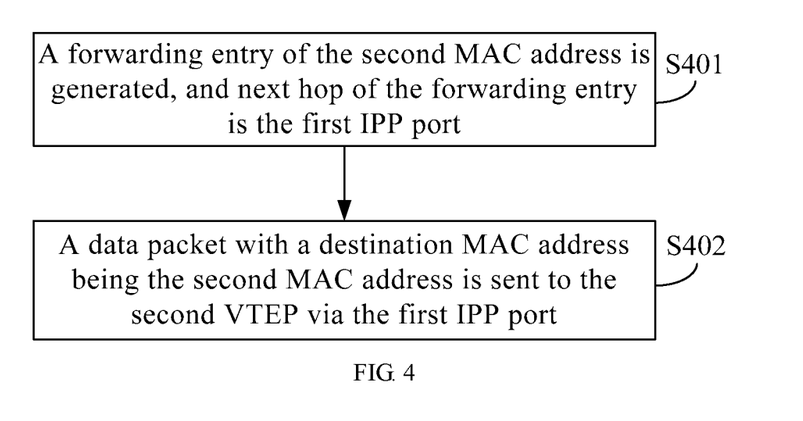
FIG. 4 is a flowchart illustrating a process of forwarding a data packet according to an example of the present disclosure.

FIG. 4 is a flowchart illustrating a process of forwarding a data packet according to an example of the present disclosure. As shown in FIG. 4, following the block S304 as above, the process may further include the following blocks.

At block S401, a forwarding entry of the second MAC address may be generated, where the forwarding entry records a correspondence of a MAC address of a device accessing the second VTEP via the second port, a tag ID, a VXLAN ID and an egress port. The egress port is a port that is successfully configured with a mapping relationship of the tag ID to the VXLAN ID. Here, the egress port may be the first IPP port.

FIG. 1 is continued as an example. Assuming that the MAC address of the CE 104 is 2-2-2, the CE 104 may send a free ARP packet when the link between the CE 104 and the VTEP 102 is UP. The VTEP 102 may learn a VXLAN MAC address of the CE 104, and learn that an egress port in a forwarding entry of the VXLAN MAC address is the port 2. After learning the VXLAN MAC address, the VTEP 102 may synchronize the forwarding entry to the VTEP 101 via the IPP2. The VTEP 101 may receive the forwarding entry via the IPP1, and create a forwarding entry of the MAC address 2-2-2, wherein an egress port in the created forwarding entry is the IPP1.

At block S402, a data packet with a destination MAC address being the second MAC address may be sent to the second VTEP via the first IPP port.

When receiving a data packet with the destination MAC address as 2-2-2, the VTEP 101 may forward the data packet to the VTEP 102 via the IPP1. Then, the VTEP 102 may forward the data packet to the CE 104 via the port 2. Thus, the forwarding of the data packet from the first VTEP to the second VTEP can be achieved. In other words, devices in different VLANs can communicate with each other.

Similarly, it can also be realized that a data packet is sent to the first VTEP from the second VTEP. Assuming that the MAC address of the CE 103 is 1-1-1, the CE 103 may send a free ARP packet when the link between the CE 103 and the VTEP 101 is UP. The VTEP 101 may learn the VXLAN MAC address of the CE 103 and learn that an egress port in a forwarding entry of the MAC address is the port 1. After learning the VXLAN MAC address, the VTEP 101 may synchronize the forwarding entry of the VXLAN MAC address to the VTEP 102 via the IPP1. The VTEP 102 may receive the forwarding entry via the IPP2, and create a forwarding entry of the MAC address 1-1-1, where an egress port in the created forwarding entry is the IPP2.

According to the above example, the forwarding of a data packet between across-VLAN devices can be achieved based on a MAC address forwarding entry.

The present disclosure also provides an example of an apparatus for synchronizing a MAC address corresponding to the example of the method of synchronizing a MAC address as discussed above.

The example of the apparatus for synchronizing a MAC address in the present disclosure may be applied to a VTEP device. The device example can be implemented by software, and can also be implemented by hardware or a combination of software and hardware. When the implementation is realized by software, as a logic apparatus, the apparatus is formed by reading corresponding machine executable instructions in a non-volatile storage medium by a processor of a VTEP device located with the apparatus to a memory for running.

Figure 5:
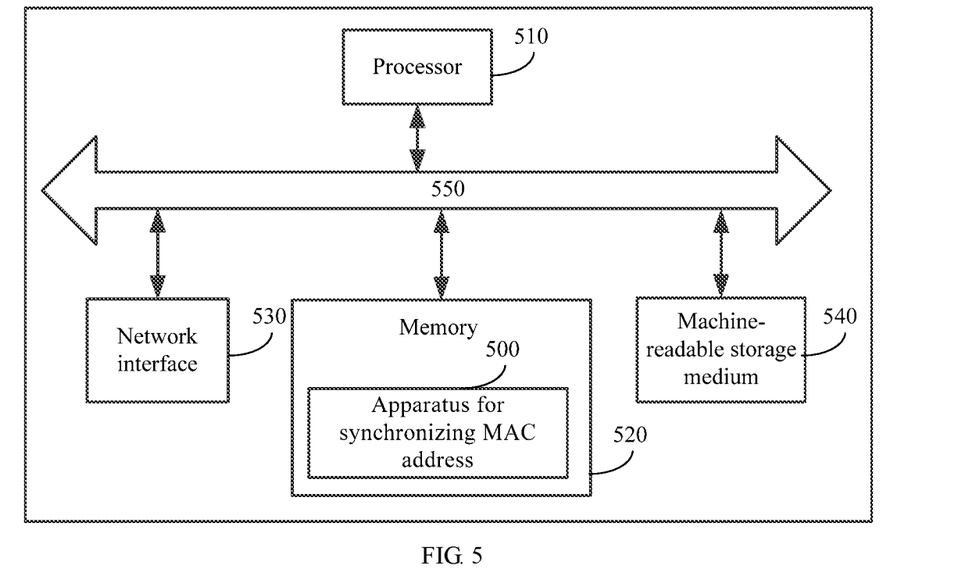
FIG. 5 is a diagram illustrating a hardware structure of a device located with an apparatus for synchronizing a MAC address according to an example of the present disclosure.

FIG. 5 is a diagram illustrating a hardware structure of a VTEP device located with an apparatus 500 for synchronizing a MAC address in the present disclosure. From the level of hardware, the apparatus 500 may include: a processor 510, a memory 520, a network interface 530 and a machine-readable storage medium 540 storing machine-executable instructions. The memory 520, network interface 530 and machine-readable storage medium 540 may communicate with each other via a system bus 550. By reading and executing the machine-executable instructions from the machine-readable storage medium to the memory 520, the processor 510 may execute the above-mentioned method of synchronizing an MAC address.

The machine-readable storage medium 540 mentioned herein may be any electronic, magnetic, optical or other physical storage devices and may contain or store information such as executable instructions, data and the like. For example, the machine readable storage medium may be: a Read-Only Memory (ROM), a volatile memory, a nonvolatile memory, a flash memory, a storage drive (e.g. hard disk drive), a solid state hard disk, any type of storage disk, and a combination of one or more of them.

Besides the components as illustrated in FIG. 5, the VTEP device located with the apparatus resides may further include other hardware according to its practical functions, which will not be redundantly described herein.

In an example, the processor 510 may perform the following operations by reading machine-executable instructions on the machine-readable storage medium 540 to the memory 520 for executing the machine-executable instructions:

notifying a first mapping relationship configured on a first aggregation port and a first Internet Printing Protocol (IPP) port of the VTEP to another VTEP, so that the other VTEP may configure the first mapping relationship on a second aggregation port and a second IPP port of the other VETP, where:
  the VTEP and the other VTEP belong to a same multi-chassis link aggregation (MLAG) system;
  the first mapping relationship represents a mapping relationship of a first tag ID of a first port of the VTEP to a first VXLAN ID; and
  a second tag ID of a second port of the other VTEP is different from the first tag ID;
receiving a successful configuration message returned by the other VTEP after successfully configuring the first mapping relationship on a second IPP port; and
sending a first MAC address to the second IPP port via the first IPP port, where the first MAC address is the MAC address of a device accessing the VTEP via the first port.

In an example, the processor is also caused by the machine-executable instructions to:
configure the first mapping relationship on the first aggregation port and the first IPP port when the first aggregation port and the first IPP port are not configured with the first mapping relationship.

In an example, when configuring the first mapping relationship on the first aggregation port and the first IPP port, the processor is also caused by the machine-executable instructions to:
  configure the first mapping relationship on the first aggregation port, and
  configure the first mapping relationship on the first IPP port, when the first aggregation port is not associated with the first tag ID and/or the first VXLAN ID.

In an example, the processor is also caused by the machine-executable instructions to:
  receive a second mapping relationship configured on the second aggregation port and the second IPP port transmitted from the other VTEP, where the second mapping relationship represents a mapping relationship of a second tag ID to a second VXLAN ID;
  configure the second mapping relationship on the first aggregation port and the first IPP port;
  send a successful configuration message indicating that the second mapping relationship is successfully configured on the first IPP port to the other VTEP; and
  receive a second MAC address via the first IPP port, where the second MAC address represents the MAC address of a device accessing the other VTEP via the second port.

In an example, the processor is also caused by the machine-executable instructions to:
  generate a forwarding entry of the second MAC address, where the forwarding records a correspondence of the MAC address of the device accessing the other VTEP via the second port, a tag ID, a VXLAN ID and an egress port, and the egress port is a port that is successfully configured with a mapping relationship of the tag ID to the VXLAN ID;
  determine the egress port as the first IPP port by querying the forwarding entry of the second MAC address; and
  send a data packet with a destination MAC address being the second MAC address to the second VTEP via the first IPP port.

Figure 6:
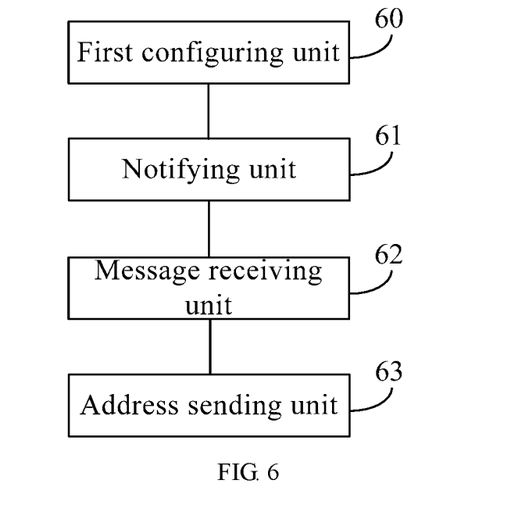
FIG. 6 is a block diagram illustrating an apparatus for synchronizing a MAC address according to an example of the present disclosure.

FIG. 6 is a block diagram illustrating an apparatus for synchronizing a MAC address according to an example of the present disclosure, the apparatus may be applied to a first VTEP. The apparatus may include a notifying unit 61, a message receiving unit 62, and an address sending unit 63.

The notifying unit 61 is configured to notify a first mapping relationship configured on a first aggregation port and a first Internet Printing Protocol (IPP) port of a first VTEP to a second VTEP in a same multi-chassis link aggregation (MLAG) system, so that the second VTEP may configure the first mapping relationship on a second aggregation port and a second IPP port of the second VETP, where the first VTEP and the second VTEP belong to the same MLAG system; the first mapping relationship represents a mapping relationship of a first tag ID of a first port of the first VTEP to a first VXLAN ID, and a second tag ID of a second port of the second VTEP is different from the first tag ID.

The message receiving unit 62 is configured to receive a successful configuration message returned by the second VTEP after the second VTEP successfully configures the first mapping relationship notified by the notifying unit 61 on the second IPP port.

The address sending unit 63 is configured to send a first MAC address to the second IPP port via the first IPP port after the message receiving unit 62 receives the successful configuration message, where the first MAC address is the MAC address of a device accessing the first VTEP via the first port.

In an example, the apparatus may also include a first configuring unit 60.

The first configuring unit 60 is configured to configure the first mapping relationship on the first aggregation port and the first IPP port when the first aggregation port and the first IPP port are not configured with the first mapping relationship before the notifying unit 61 notifies the first mapping relationship configured on the first aggregation port and the first IPP port of the first VTEP to the second VTEP in the same MLAG system.

In another example, the first configuring unit may be specifically configured to configure the first mapping relationship on the first aggregation port and the first IPP port when the first aggregation port is not associated with the first tag ID and/or the first VXLAN ID.

Figure 7:
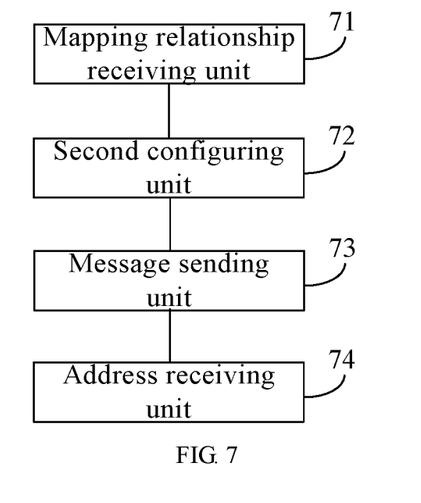
FIG. 7 is a block diagram illustrating an apparatus for synchronizing a MAC address according to another example of the present disclosure.

In still another example, as shown in FIG. 7, the apparatus may also include a mapping relationship receiving unit 71, a second configuring unit 72, a message sending unit 73 and an address receiving unit 74 on the basis of the example illustrated in FIG. 6.

The mapping relationship receiving unit 71 is configured to receive a second mapping relationship configured on the second aggregation port and the second IPP port from the second VTEP, where the second mapping relationship represents a mapping relationship of a second tag ID to a second VXLAN ID.

The second configuring unit 72 is configured to configure the second mapping relationship received by the mapping relationship receiving unit 71 on the first aggregation port and the first IPP port.

The message sending unit 73 is configured to send a successful configuration message to the second VTEP when the second configuring unit 72 successfully configures the second mapping relationship on the first IPP port.

The address receiving unit 74 is configured to receive a second MAC address via the first IPP port after the message sending unit 73 sends the successful configuration message, where the second MAC address represents the MAC address of a device accessing the second VTEP via the second port.

Figure 8:
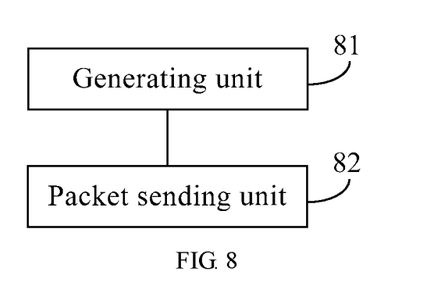
FIG. 8 is a block diagram illustrating an apparatus for synchronizing a MAC address according to still another example of the present disclosure.

In still another example, as shown in FIG. 8, the apparatus may also include a generating unit 81 and a packet sending unit 82 on the basis of the example illustrated in FIG. 7.

The generating unit 81 is configured to generate a forwarding entry of the second MAC address, where the forwarding entry records a correspondence of the MAC address of the device accessing the second VTEP via the second port, a tag ID, a VXLAN ID and an egress port, and the egress port is a port that is successfully configured with a mapping relationship of the tag ID to the VXLAN ID; herein, the egress port is the first IPP port.

The packet sending unit 82 is configured to send a data packet with a destination MAC address being the second MAC address to the second VTEP via the first IPP port in the forwarding entry generated by the generating unit 81.

Details of the implementation process of the functions and effects of different units in the above-described apparatus may be seen from the implementation process of corresponding blocks in the above-described method, which will not be redundantly described herein.

Since the apparatus embodiments substantially correspond to the method embodiments, a reference may be made to part of the descriptions of the method embodiments for the related part. The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those of ordinary skill in the art may understand and carry out them without creative work.

According to the above apparatus for synchronizing a MAC address, the first mapping relationship of the first tag ID of the first port to the first VXLAN ID configured on the first aggregation port and the first Internet Printing Protocol (IPP) port of the first VTEP may be notified to the second VTEP in the same MLAG system. Then the second VTEP may successfully configure the first mapping relationship on the second aggregation port and the second IPP port of the second VETP, that is, the first IPP port and the second IPP port are configured with the same mapping relationship. Then, the first MAC address of a device which accesses the first VTEP through the first port can be sent to the second IPP port via the first IPP port so as to realize the synchronization of the MAC address from the first VTEP to the second VTEP. Besides, the first VTEP may receive the second mapping relationship sent by the second VTEP after the second VTEP configures the second mapping relationship of the second tag ID to the second VXLAN ID on the second aggregation port and the second IPP port. Then the first VTEP may configure the second mapping relationship on the first aggregation port and the first IPP port. Then the first VTEP may receive the second MAC address of the device which accesses the second VTEP through the second port via the first IPP port that is successfully configured with the second mapping relationship. Thus, the synchronization of the MAC address from the second VTEP to the first VTEP can be achieved.

The above are detailed description of a method and an apparatus provided according to the embodiments of the present disclosure. Specific examples are used herein to set forth the principles and the implementing methods of the present disclosure, and the descriptions of the above embodiments are only meant to help understanding of the method and the core idea of the present disclosure. Meanwhile, those of ordinary skill in the art may make alterations to the specific embodiments and the scope of application in accordance with the idea of the present disclosure. In conclusion, the contents of the present specification shall not be interpreted as limiting to the present disclosure.

The invention claimed is:

1. A method of synchronizing a Media Access Control (MAC) address, comprising:
  notifying, by a first Virtual Extensible Local Area Network (VXLAN) Tunnel End Point (VTEP), a first mapping relationship configured on a first aggregation port and a first Internet Printing Protocol (IPP) port of the first VTEP to a second VTEP, so that the second VTEP configures the first mapping relationship on a second aggregation port and a second IPP port of the second VETP, wherein:
    the first VTEP and the second VTEP belong to a same multi-chassis link aggregation system;
    the first mapping relationship represents a mapping relationship of a first tag Identifier (ID) of a first port of the first VTEP to a first Virtual Extensible Local Area Network (VXLAN) ID; and
    a second tag ID of a second port of the second VTEP is different from the first tag ID;
  receiving, by the first VTEP, a successful configuration message returned by the second VTEP after the second VTEP successfully configures the first mapping relationship on the second IPP port of the second VTEP; and sending, by the first VTEP, a first MAC address to the second IPP port via the first IPP port, wherein the first MAC address is the MAC address of a device accessing the first VTEP via the first port.

2. The method according to claim 1, further comprising:
configuring, by the first VTEP, the first mapping relationship on the first aggregation port and the first IPP port when the first aggregation port and the first IPP port are not configured with the first mapping relationship.

3. The method according to claim 2, wherein configuring the first mapping relationship on the first aggregation port and the first IPP port comprises:
configuring, by the first VTEP, the first mapping relationship on the first aggregation port and the first IPP port, when the first aggregation port is not associated with at least one of the first tag ID and the first VXLAN ID.

4. The method according to claim 1, further comprising:
receiving, by the first VTEP, a second mapping relationship configured on the second aggregation port and the second IPP port transmitted from the second VTEP, wherein the second mapping relationship represents a mapping relationship of the second tag ID to a second VXLAN ID;
configuring, by the first VTEP, the second mapping relationship on the first aggregation port and the first IPP port;
sending, by the first VTEP, a successful configuration message indicating that the second mapping relationship is successfully configured on the first IPP port to the second VTEP; and
receiving, by the first VTEP, a second MAC address via the first IPP port, wherein the second MAC address represents the MAC address of a device accessing the second VTEP via the second port.

5. The method according to claim 4, further comprising:
generating, by the first VTEP, a forwarding entry of the second MAC address, wherein the forwarding entry records a correspondence of the MAC address of the device accessing the second VTEP via the second port, a tag ID, a VXLAN ID and an egress port, and the egress port is a port that is successfully configured with a mapping relationship of the tag ID to the VXLAN ID;
determining, by the first VTEP, the egress port as the first IPP port by querying the forwarding entry of the second MAC address; and
sending, by the first VTEP, a data packet with a destination MAC address being the second MAC address to the second VTEP via the first IPP port.

6. A Virtual Extensible Local Area Network (VXLAN) Tunnel End Point (VTEP), comprising:
a processor; and
a machine-readable storage medium that stores machine-executable instructions, wherein by reading and executing the machine-executable instructions, the processor is caused to:
notify a first mapping relationship configured on a first aggregation port and a first Internet Printing Protocol (IPP) port of the VTEP to another VTEP, so that the other VTEP configures the first mapping relationship on a second aggregation port and a second IPP port of the other VETP, wherein:
the VTEP and the other VTEP belong to a same multi-chassis link aggregation system;
the first mapping relationship represents a mapping relationship of a first tag Identifier (ID) of a first port of the VTEP to a first Virtual Extensible Local Area Network (VXLAN) ID; and
a second tag ID of a second port of the other VTEP is different from the first tag ID;
receive a successful configuration message returned by the other VTEP after the other VTEP successfully configures the first mapping relationship on the second IPP port; and
send a first MAC address to the second IPP port via the first IPP port, wherein the first MAC address is the MAC address of a device accessing the VTEP via the first port.

7. The VTEP according to claim 6, wherein the processor is further caused by the machine-executable instructions to:
configure the first mapping relationship on the first aggregation port and the first IPP port when the first aggregation port and the first IPP port are not configured with the first mapping relationship.

8. The VTEP according to claim 7, wherein when configuring the first mapping relationship on the first aggregation port and the first IPP port, the processor is further caused by the machine-executable instructions to:
configure the first mapping relationship on the first aggregation port and the first IPP port when the first aggregation port is not associated with at least one of the first tag ID and the first VXLAN ID.

9. The VTEP according to claim 6, wherein the processor is further caused by the machine-executable instructions to:
receive a second mapping relationship configured on the second aggregation port and the second IPP port transmitted from the other VTEP, wherein the second mapping relationship represents a mapping relationship of the second tag ID to a second VXLAN ID;
configure the second mapping relationship on the first aggregation port and the first IPP port;
send a successful configuration message indicating that the second mapping relationship is successfully configured on the first IPP port to the other VTEP; and
receive a second MAC address via the first IPP port, wherein the second MAC address represents the MAC address of a device accessing the other VTEP via the second port.

10. The VTEP according to claim 9, wherein the processor is further caused by the machine-executable instructions to:
generate a forwarding entry of the second MAC address, wherein the forwarding entry records a correspondence of the MAC address of the device accessing the other VTEP via the second port, a tag ID, a VXLAN ID and an egress port, and the egress port is a port that is successfully configured with a mapping relationship of the tag ID to the VXLAN ID;
determine the egress port as the first IPP port by querying the forwarding entry of the second MAC address; and
send a data packet with a destination MAC address being the second MAC address to the other VTEP via the first IPP port.

11. An apparatus for synchronizing a Media Access Control (MAC) address, comprising:
a notifying unit to notify a first mapping relationship configured on a first aggregation port and a first Internet Printing Protocol (IPP) port of a first Virtual Extensible Local Area Network (VXLAN) Tunnel End Point (VTEP) to a second VTEP, so that the second VTEP configures the first mapping relationship on a second aggregation port and a second IPP port of the second VETP,
  wherein the first VTEP and the second VTEP belong to a same multi-chassis link aggregation system;
  the first mapping relationship represents a mapping relationship of a first tag Identifier (ID) of a first port of the first VTEP to a first Virtual Extensible Local Area Network (VXLAN) ID; and
  a second tag ID of a second port of the second VTEP is different from the first tag ID;
a message receiving unit to receive a successful configuration message returned by the second VTEP after the second VTEP successfully configures the first mapping relationship notified by the notifying unit on the second IPP port; and
an address sending unit to send a first MAC address to the second IPP port via the first IPP port after the message receiving unit receives the successful configuration message, wherein the first MAC address is the MAC address of a device accessing the first VTEP via the first port.

12. The apparatus according to claim 11, further comprising:
  a first configuring unit to configure the first mapping relationship on the first aggregation port and the first IPP port when the first aggregation port and the first IPP port are not configured with the first mapping relationship, before the notifying unit notifies the first mapping relationship configured on the first aggregation port and the first IPP port of the first VTEP to the second VTEP in the same multi-chassis link aggregation system.

13. The apparatus according to claim 12, wherein the first configuring unit is specifically to:
  configure the first mapping relationship on the first aggregation port and the first IPP port when the first aggregation port is not associated with at least one of the first tag ID and the first VXLAN ID.

14. The apparatus according to claim 11, further comprising:
  a mapping relationship receiving unit to receive a second mapping relationship configured on the second aggregation port and the second IPP port transmitted from the second VTEP, wherein the second mapping relationship represents a mapping relationship of the second tag ID to the second VXLAN ID;
  a second configuring unit to configure the second mapping relationship received by the mapping relationship receiving unit on the first aggregation port and the first IPP port;
  a message sending unit to send a successful configuration message to the second VTEP when the second configuring unit successfully configures the second mapping relationship on the first IPP port; and
  an address receiving unit to receive a second MAC address via the first IPP port after the message sending unit sends the successful configuration message, wherein the second MAC address represents the MAC address of a device accessing the second VTEP via the second port.

15. The apparatus according to claim 14, further comprising:
  a generating unit to generate a forwarding entry of the second MAC address, wherein the forwarding entry records a correspondence of the MAC address of the device accessing the second VTEP via the second port, a tag ID, a VXLAN ID and an egress port, and the egress port is a port that is successfully configured with a mapping relationship of the tag ID to the VXLAN ID; and
  a packet sending unit to determine the egress port as the first IPP port by querying the forwarding entry of the second MAC address, and send a data packet with a destination MAC address being the second MAC address to the second VTEP via the first IPP port.

* * * * *